(12) United States Patent
Pantuso et al.

(10) Patent No.: US 8,336,777 B1
(45) Date of Patent: Dec. 25, 2012

(54) COVERT AIMING AND IMAGING DEVICES

(76) Inventors: Francis P. Pantuso, Manchester, NH (US); Rick K. Dorval, Dunbarton, NH (US)

( * ) Notice: Subject to any disclaimer, the term of this patent is extended or adjusted under 35 U.S.C. 154(b) by 438 days.

(21) Appl. No.: 12/644,828

(22) Filed: Dec. 22, 2009

Related U.S. Application Data

(60) Provisional application No. 61/139,897, filed on Dec. 22, 2008.

(51) Int. Cl.
*G06F 19/00* (2006.01)
(52) U.S. Cl. .......................................... 235/409; 235/404
(58) Field of Classification Search ............... 235/404, 235/409, 412; 359/409
See application file for complete search history.

(56) References Cited

U.S. PATENT DOCUMENTS

| | | | | |
|---|---|---|---|---|
| 7,307,793 | B2* | 12/2007 | Ottney et al. | 359/634 |
| 7,643,210 | B2* | 1/2010 | Faure | 359/407 |
| 2007/0103773 | A1* | 5/2007 | Schwartz, II et al. | 359/409 |
| 2008/0204361 | A1* | 8/2008 | Scales et al. | 345/8 |
| 2011/0254855 | A1* | 10/2011 | Anders | 345/589 |

OTHER PUBLICATIONS

David Sachs, Steven Nasiri, Daniel Goehl, Image Stabilization Technology Overview, Santa Clara, CA, www.InvenSense.com, 18 pages. Believed by applicant to be representative of prior art.

Ovation Systems, Ltd., Stable Eyes Real-time Image Stablisation for High-Zoom Surveillance Cameras, 3 pages, Aug. 2, 2006.

Dean Kissinger, Advanced Weapon Sight Technology (AWST) Program Overview Briefing, RDECOM, 14 pages Nov. 10, 2009.

* cited by examiner

*Primary Examiner* — Ahshik Kim

(57) ABSTRACT

A weapon aiming system projects an aim point and/or an image from a weapon mounted vision system into a display coupled to a head-mounted vision system to aid in acquiring a target. The system incorporates electronic image stabilization and is capable of maintaining a reticle aligned with a point-of-impact of a weapon.

23 Claims, 12 Drawing Sheets

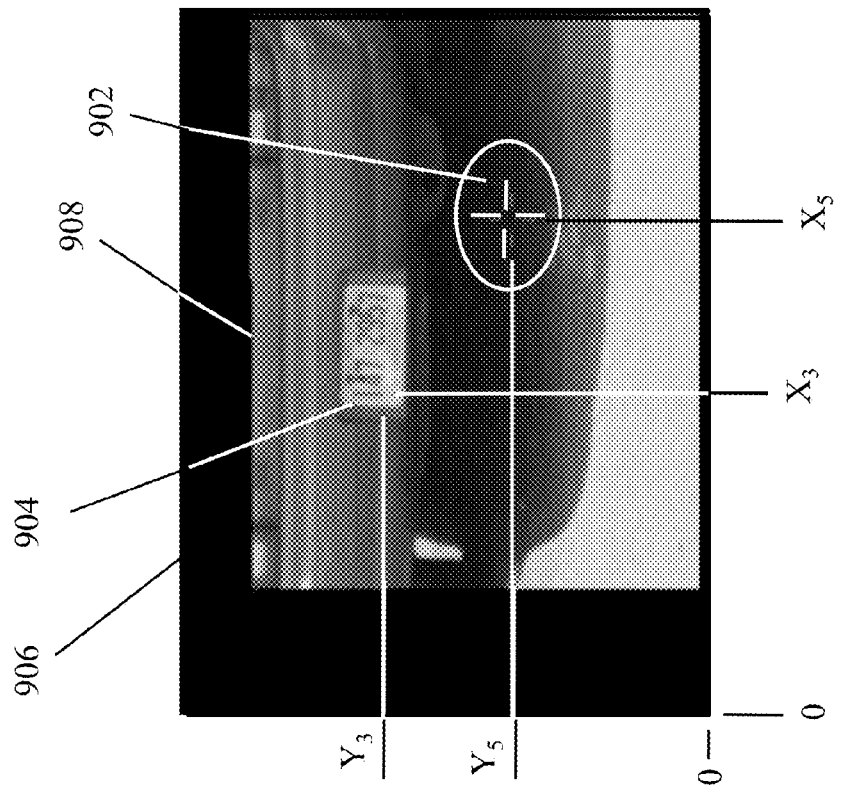
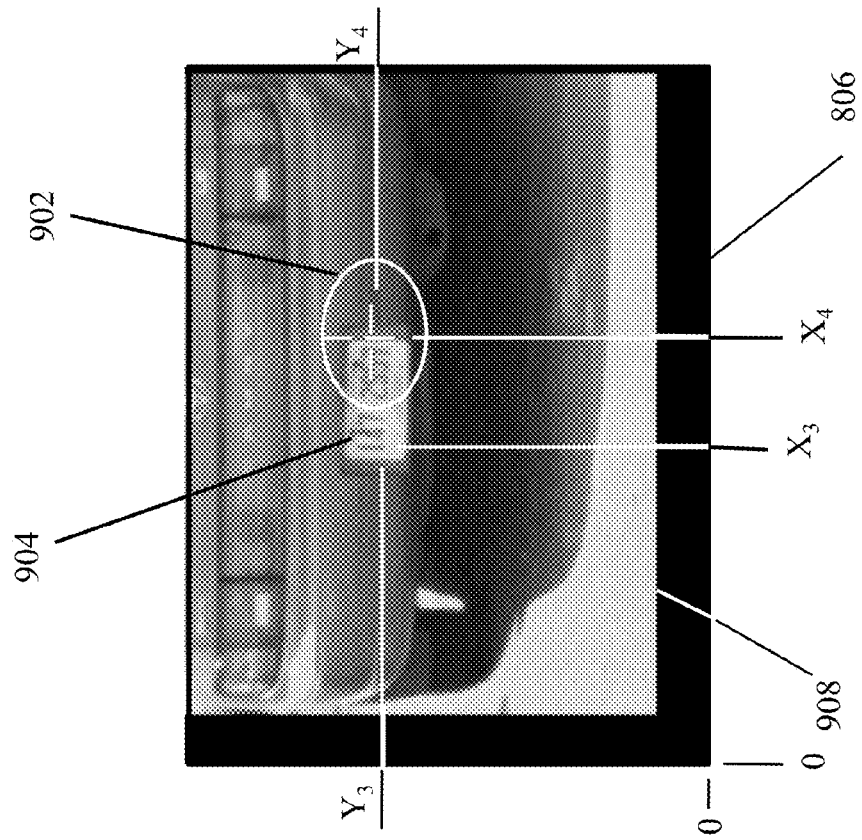

COVERT AIMING AND IMAGING DEVICES

CROSS REFERENCE TO RELATED APPLICATIONS

The present application claims the benefit of Provisional Patent Application Ser. No. 61/139,897, filed Dec. 22, 2008 the entire disclosures of which are incorporated herein by reference in their entirety.

BACKGROUND OF THE INVENTION

Night vision systems include image intensification and infrared imaging monoculars, binoculars, bioculars, and goggles, whether hand-held, weapon mounted, or helmet mounted. Image intensification systems are typically equipped with one or more image intensifier tubes to allow an operator to see a range of wavelengths of radiation (approximately 400 nm to approximately 900 nm). They work by collecting the tiny amounts of light, including the visible spectrum and the lower portion of the infrared spectrum, that are present but may be imperceptible to our eyes, and amplifying it to the point that an operator can easily observe the image. These systems have been used by soldier and law enforcement personnel to see in low light conditions, for example at night or in caves and darkened buildings. A drawback to image intensification systems is that they may be attenuated by smoke and heavy sand storms and may not see a person hidden under camouflage. Other devices with an image sensor capable of converting an optical image to an electrical signal can be used in low light conditions. An image sensor may be a charge-coupled device (CCD), a complementary metal-oxide-semiconductor (CMOS) active-pixel sensor, or other sensor.

Infrared imagers allow an operator to see people and objects because they emit or reflect energy in the infrared spectrum. These systems operate by capturing energy in the infrared spectrum, which may not be perceivable by the human eye, and display the scene information to a user through an eyepiece or display. These systems may capture the upper portion of the infrared spectrum (7,000-14,000 nm), which capture electromagnetic radiation emitted by objects instead of simply reflected as light. Any object that has a temperature radiates in the infrared spectrum. An infrared sensor may be a VNIR (very near infrared), SWIR (shortwave infrared), MWIR (medium wave infrared), or LWIR (long wave infrared) sensor, for example, a focal plane array or microbolometer.

Fusion systems have been developed that combine visible and infrared sensors in a single enclosure. The visible information and the infrared information may be optically or digitally fused together to provide an image that provides benefits over the visible and the infrared spectrum. Other combinations of wavebands may also be fused such as, but not limited to, VNIR and LWIR or SWIR and LWIR.

When these vision systems are handheld or mounted on a weapon or a helmet, movement of the systems, combined with any delay caused by processing of the scene data may cause viewing difficulties. These viewing difficulties may prevent a soldier or operator from easily identifying a target or comprehending information on signs.

When a vision system is mounted on a weapon, a mechanical or electronic reticle in the vision system may be boresighted with the weapon to allow an operator to fire the weapon while looking at a display, either directly or through an eyepiece. The vision systems may allow the operator to move the reticle up or down to compensate for ballistic drop as the distance to target changes or to move the reticle left or right to adjust for windage, or both.

BRIEF DESCRIPTION OF THE DRAWINGS

For a better understanding of the invention, together with other objects, features and advantages, reference should be made to the following detailed description which should be read in conjunction with the following figures wherein like numerals represent like parts:

FIGS. 9A and 9B are a third and a fourth frame respectively of a scene through the third imaging system of FIG. 7.

DETAILED DESCRIPTION

Figures 1A, 1B:
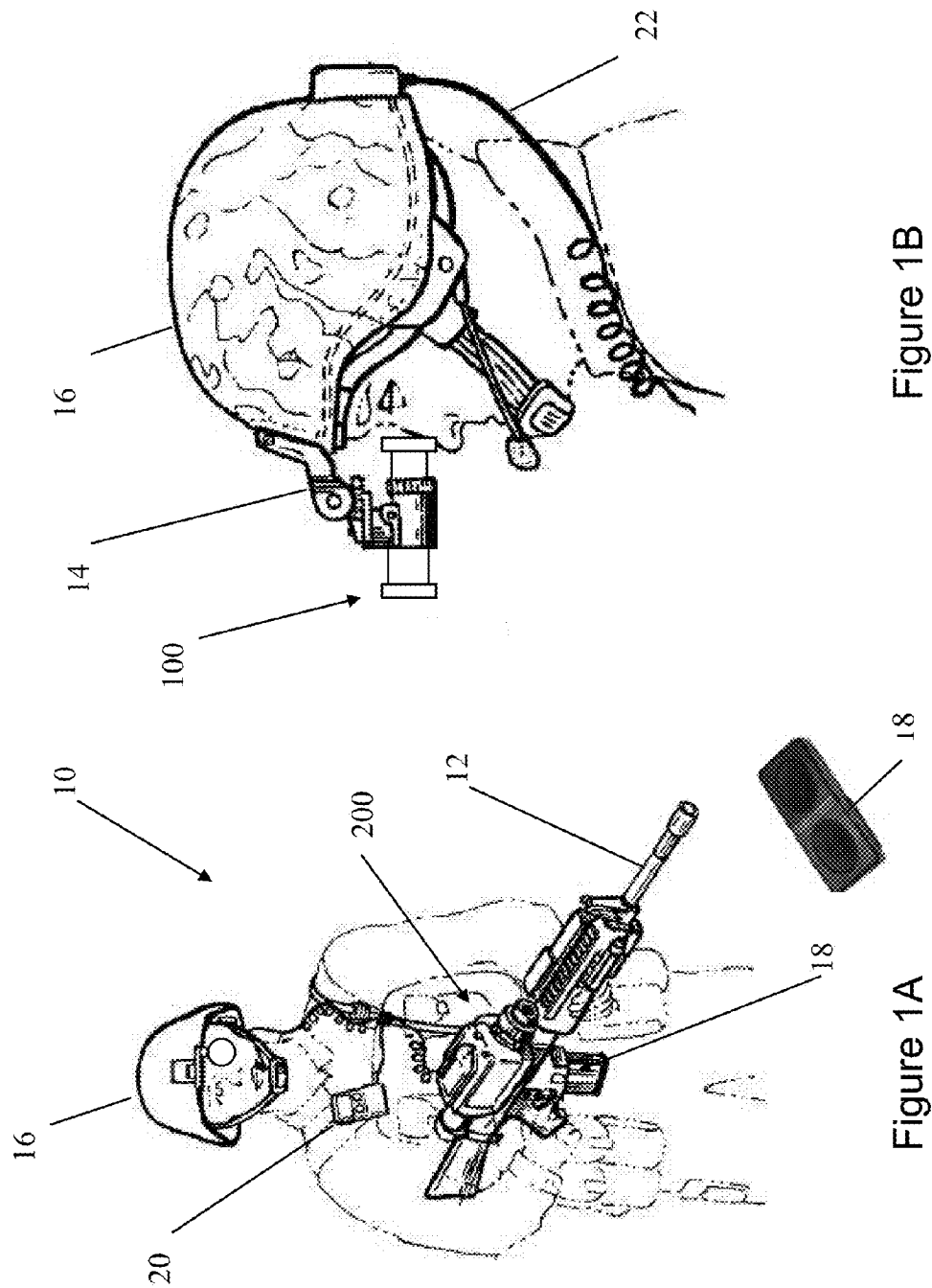
FIG. 1A is a front view of a soldier with a covert aiming system consistent with a first embodiment of the invention.
FIG. 1B is a right side view of the soldier and covert aiming system of FIG. 1A.

FIGS. 1A and 1B show a soldier with a covert aiming system 10 consistent with a first embodiment of the invention. The aiming system 10 may have a first imaging system 100 coupled to a helmet or other headgear 16 through a mount 14, a second imaging system 200 mounted on, and possibly bore-sighted to, a weapon 12, and a first selector 18 that may be mounted to the weapon 12 or a second selector 20 that may be worn on the uniform of a soldier or other user. The first imaging system 100 and the second imaging system 200 may communicate with each other through a cable 22 or wirelessly. The first imaging system 100 may be a monocular, binocular, biocular or goggle. The imaging systems 100, 200 may work in the visible and/or the infrared spectrum.

The first imaging device 100 may be mounted to the helmet/head gear 16 with the output displayed near to the user's eye to provide situational awareness and viewing of a target or area of interest and the second imaging device 200 may be mounted on the weapon 12 to aid in directing weapon fire. The first imaging device may have a wider field of view (30+ degrees) than the second imaging device (less than 20 degrees), although they may have the same or similar field-of-view without departing from the invention.

Figure 2:
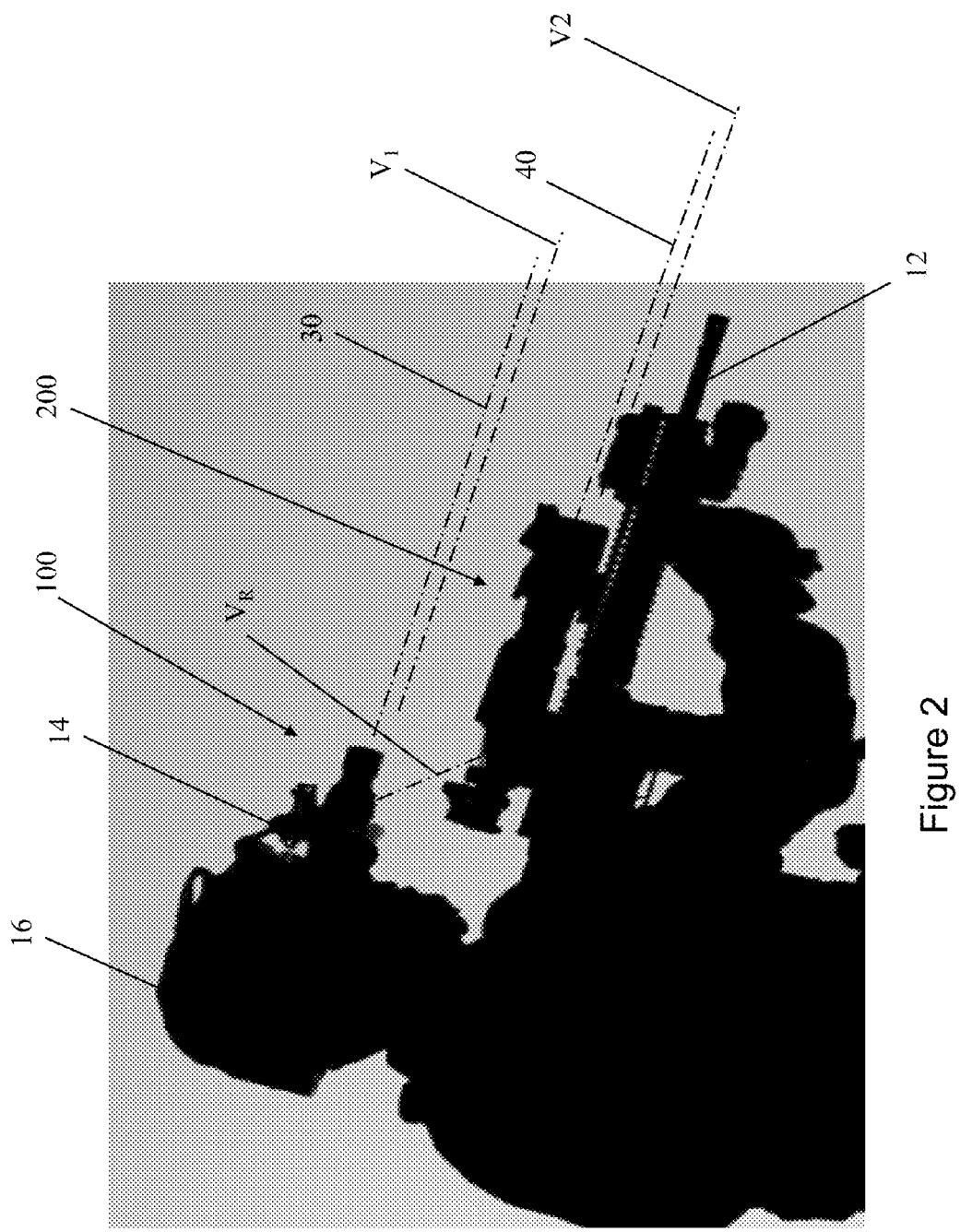
FIG. 2 is a silhouette of a soldier using the covert aiming system of FIG. 1A.

FIG. 2 shows that a soldier or other user may look through the first imaging device 100 mounted to the helmet 16 at a target or area of interest while holding the weapon 12 upon which is mounted the second imaging system 200. The user may rotate his/her head along with the first imaging system 100 to look at a variety of target while keeping the weapon 12 pointed generally forward. The optical axis 30 of the first imaging system 100 may be moved independent of the optical axis 40 of the second imaging system 200 and the weapon 12. When a soldier identifies a target or area of interest with the first imaging system 100, the soldier may want to direct the weapon 12 at the target without having to remove the first imaging system 100 from his/her field of view, and possible lose sight of the target, and then have to align his/her eye with the output end of the second imaging system 200 and reacquire the target. When the first imaging system 100 and the second imaging system 200 operate in different portions of the light spectrum, the systems may provide additional information to the soldier.

Figure 3B:
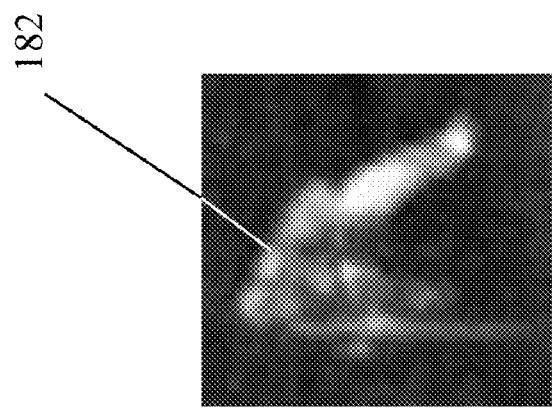
FIG. 3B is a view of a scene through a second imaging system of FIG. 1A consistent with a second embodiment of the invention.
Figure 3A:
FIG. 3A is a view of a scene through a first imaging system of FIG. 1A consistent with a second embodiment of the invention.

FIG. 3A is a view of a scene through the first imaging system 100 and FIG. 3B is a view of the same scene through the second imaging system 200. The first imaging system 100 may have a sensor that detects scene information in any portion of the electromagnetic spectrum, for example the visible spectrum and/or the VNIR and have a wider field of view than the second imaging system 200 that may detect scene information, for example the long wave infrared spectrum (7,000-14,000 nm). Alternatively, similar sensors may be in both the first and the second imaging systems.

Figure 4:
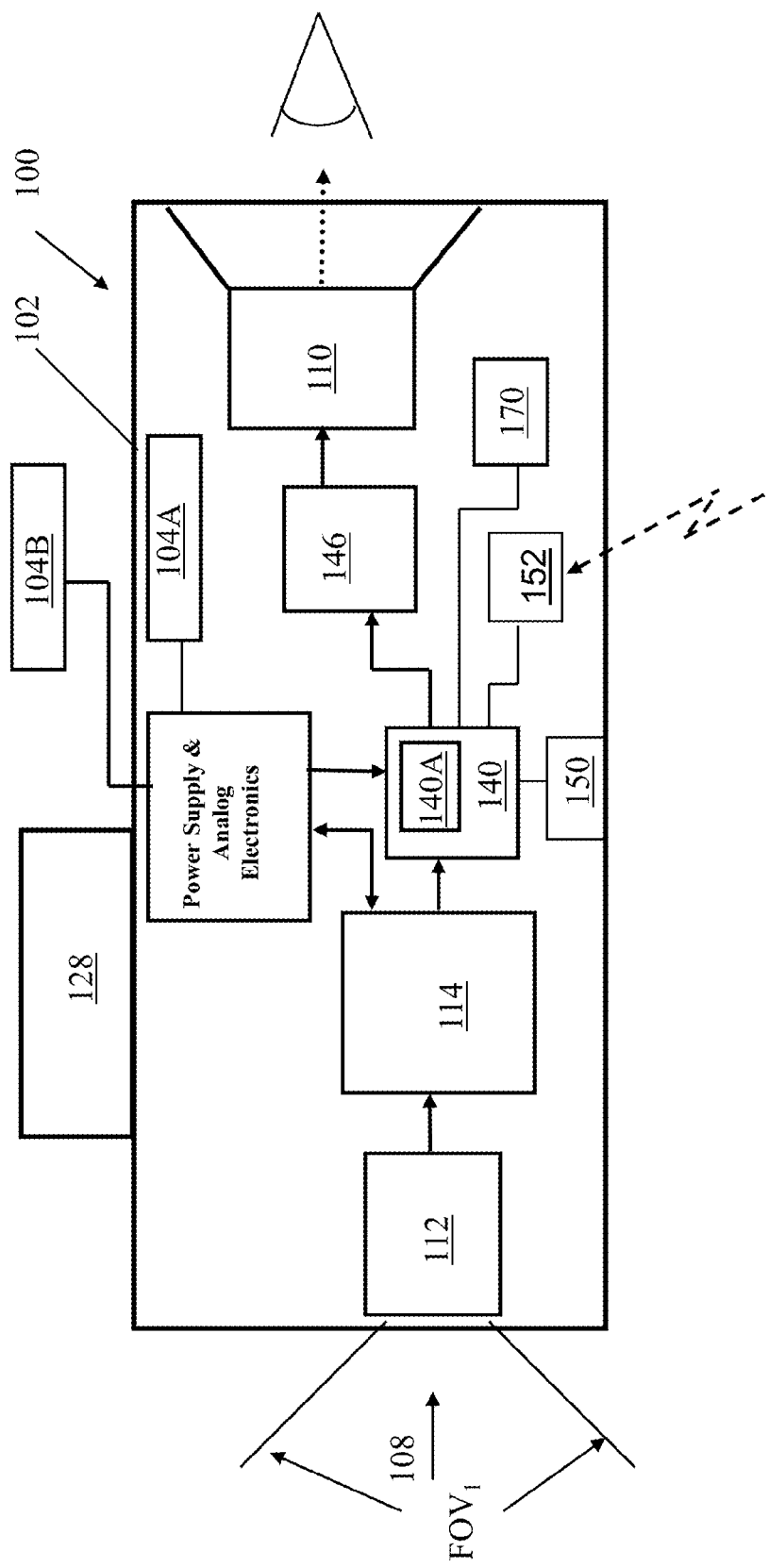
FIG. 4 is a block diagram of the first imaging device of FIG. 1A.

FIG. 4 is a block diagram of the first imaging system 100 consistent with a first embodiment of the invention. The electronics and optics may be housed in a housing 102 and powered by an internal power source 104A or an external power source 104B. The first imaging system 100 may be coupled to the helmet or headgear 16 through the mount 114 with a mount 128. Scene information 108 may enter the system 100 through a first objective lens 112, which may have an adjustable focus, and be directed onto a first sensor 114. The sensor 114 may operate in the visible portion of the electromagnetic spectrum (from ~400 nm to ~750 nm) or the infrared portion of the electromagnetic spectrum (from ~750 nm to ~14,000 nm), e.g., SWIR (shortwave infrared), MWIR (medium wave infrared), or LWIR (long wave infrared), or both, for example an image intensification ($I^2$) tube. Other sensor technologies including near infrared electron bombarded active pixel sensors or short wave InGaAs arrays may be used without departing from the invention. An $I^2$ tube may process scene information 108 in a range of wavelengths (the visible portion of the electromagnetic spectrum plus a small portion of the infrared spectrum from ~400 nm to ~900 nm). The output of the sensor 114 may be coupled to electronics 140 for processing and the output of the electronics 140 may be inputted into display electronics 146 for viewing through the eyepiece 110. The eyepiece(s) may have one or more ocular lenses for magnifying and/or focusing the information on the display 146. If an $I^2$ tube or other analog sensor is used, the analog output may be converted to a digital output with a CCD or other device. The electronics 140 may receive scene information from a second imaging system 200 through a wired port 150 or a wireless receiver port 152. The system 100 may have a first field of view $FOV_1$ that is wider (for example 30+ degrees) than the second imaging system 200 (for example less than 20 degrees). The wider field of view may provide greater situational awareness and the narrower field of view may provide better detail.

The first imaging system 100 may have a first inertial measurement unit (IMU) 170. The IMU 170 may detect the current rate of acceleration, as well as changes in rotational attributes, including pitch, roll and yaw of the first imaging system 100. A processor 140A may process the data received from the IMU 170 data, combine it with data from the second imaging system 200, and display the combined processed information in the display 146. The processor 140A may receive the data from the second imaging system 200 through the port 150/152 from a wired port 250 or wireless port 252 in the second imaging system 200. The processor 140A may calculate a first direction vector $V_1$ with data from IMU 170 that is generally parallel with optical axis 30 of the first imaging system 100. The first direction vector $V_1$ may be used for image registration when first imaging system 100 and second imaging system 200 have overlapping fields of view (FOV).

Figure 5:
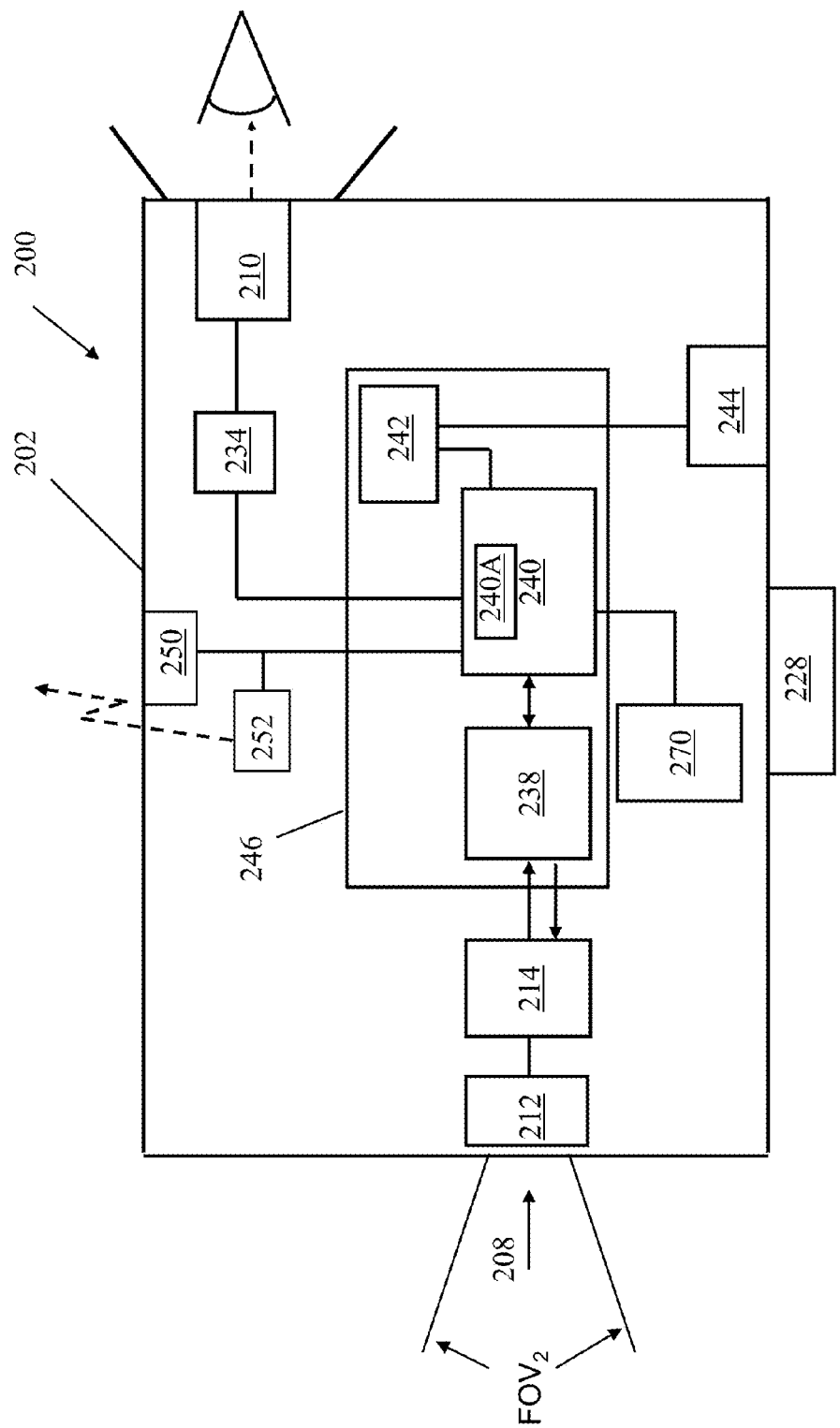
FIG. 5 is a block diagram of the second imaging device of FIG. 1A.

FIG. 5 is a block diagram of a second imaging system 200 consistent with a second embodiment of the invention. The electronics and optics may be at least partially housed in a housing 202, which can be mounted to a weapon through a mount 228. Scene information 208 may enter the system 200 through a second objective lens 212, which may have an adjustable focus, and be directed onto a second sensor 214. The second sensor 214 may be the same or different type as the first sensor 114. Enclosed at least partially within the housing 202 may be an analog circuit card assembly 238, a digital circuit card assembly 240, a power circuit card assembly 242, a display 234, and an eyepiece(s) 210. The eyepiece(s) 210 may have one or more ocular lenses for magnifying and/or focusing information on the display 234. The analog circuit card assembly 238, the digital circuit card assembly 240, and the power circuit card assembly 242 may be combined on a single circuit assembly 246 for example an ASIC, or DSP chip to process the scene information 208. The second imaging system 200 may be powered by an internal battery 244 or an external power source (not shown). The second sensor 214 may be configured to process information in a portion of the infrared electromagnetic spectrum (~750 nm to approximately 14,000 nm). The low end and the high end of the range of wavelengths may vary without departing from the invention. The sensor 214 may be a long wave infrared focal plane array, or a short wave infrared focal plane array, or any other sensor capable of sensing energy, without departing from the invention. The system 200 may output processed scene information to the first imaging system 100 through the wired port 250 or the wireless transmitter port 252. The system 200 may have a second field of view $FOV_2$. An optical axis of the system 200 may be generally aligned parallel with a barrel of a weapon 12.

The second imaging system 200 may have a second IMU 270. The IMU 270 may detect the current rate of acceleration, as well as changes in rotational attributes, including pitch, roll and yaw of the second imaging system 200. The IMU data may then be communicated to the digital circuit card assembly 240 for processing or transfer to the first imaging system 100 through the wired port 250 or the wireless transmitter port 252. The processor 240A may calculate a second direction vector $V_2$ with data from the IMU 270 that is generally parallel with optical axis 40 of the second imaging system 200. As noted above, the direction vectors $V_1$, $V_2$ calculated by processor 140A and processor 240A may be used for image registration when first imaging system 100 and second imaging system 200 have overlapping FOVs. This may provide a course alignment of the two images. Further image processing techniques such as image warping to match magnification between first imaging system 100 and second imaging system 200, skew correction and edge detection may be used to align the images at the pixel or sub-pixel level.

Through the alignment process, the direction of the optical axis 30 can be determined relative to the optical axis 40. A coarse alignment may be performed followed by a fine alignment, if necessary. A coarse alignment may be obtained with the following information:

1) the position of first imaging system 100 relative to second imaging system 200 possibly assumed or measured with compasses or IMU 170, 270;
2) the azimuth and elevation of the optical axis 30 possibly using one or more internal compasses, which may be part of IMU 170;
3) the azimuth and elevation of the optical axis 40 possibly using one or more internal compasses, which may be part of IMU 270.

The processor 140A may calculate the first direction vector $V_1$, which may be generally parallel with the optical axis 30, for the first imaging system 100 using information from 2 above. Processor 140A may calculate the direction vector $V_R$ from the imaging system 100 to imaging system 200 using information from 1 above. Processor 140A or 240A may then calculate the second direction vector $V_2$, which may be generally parallel with the optical axis 40, for the second imaging system 200 using information from 3 above. By mathematically adding the first direction vector $V_1$ to the second direction vector $V_2$, optical axis 40 may then be known relative to optical axis 30.

A fine alignment may be performed with the following information:
1) video data from imaging system 100;
2) video data from imaging system 200;
3) coarse alignment information from the coarse alignment process;

Processor 140A may scan video data from imaging system 100 and compare it to video data from imaging system 200. The coarse alignment process may provide information to the processor 140A to aid in the fine alignment process. Significant features from the scene may be used to perform the fine alignment. At the completion of the fine alignment process, the pixel data that is on the optical axis of imaging system 200 may then be aligned with the pixel data from imaging system 100 thus allowing the display of an indicator, such as a crosshair, to display the aim point of the weapon.

Alternatively, a global alignment process may be used to determine the optical axis 30 relative to the optical axis 40. A first direction vector for the first imaging system 100 may be determined in free space using a global positioning system with one or more sensors to determine its azimuth and elevation and a second direction vector for the second imaging system 200 may be determined in free space using the global positioning system with one or more sensors to determine its azimuth and elevation.

Alternatively, a calibration process may be used in which a visible or infrared laser, aligned with the barrel of the weapon, may be directed at an object and then the user signals the system when a reticle or other indicator in the first imaging system 100 is aligned with the object or the user moves the first imaging system around until the system determines a scene match.

Figure 6B:
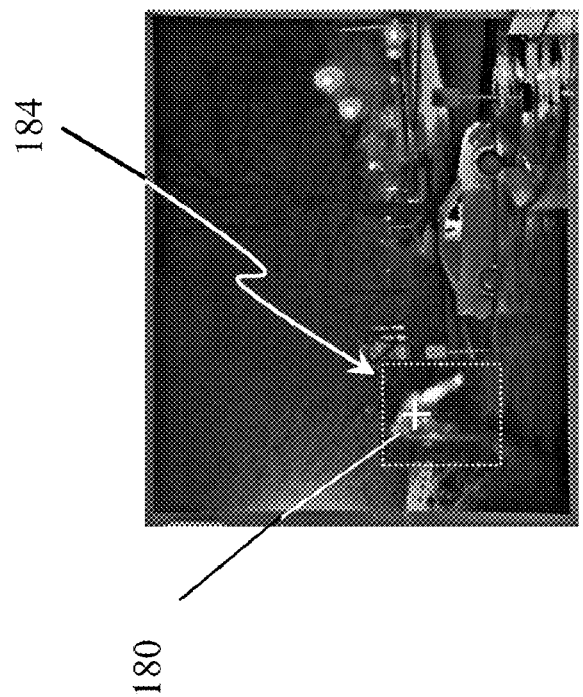
FIGS. 6A, 6B, 6C, and 6D are views of a scene through the first imaging device of FIG. 1A.
Figure 6A:
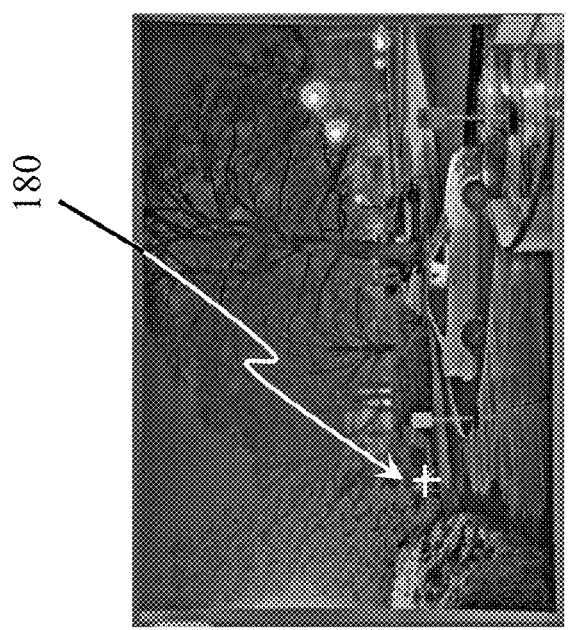

FIGS. 6A, 6B, 6C, and 6D are views through the first imaging device 100 of FIG. 1A. As shown in FIG. 6A, the system 10 may be capable of superimposing an aim point 180 derived from the second imaging system 200 over the image from the first imaging system 100. The aim point 180 may be derived from information from the first IMU 170 and the second IMU 270 and displayed in the display 146. In this example, a user wearing a helmet mounted image intensifier night vision system (a first imaging system) may see a person 182 hiding in the bushes and wants to better determine who the "threat" is by utilizing a weapon-mounted thermal imager (a second imaging system) without having to flip the first imaging system out of the way and then reacquire the person 182 with the second imaging system. The user may utilize an actuator on the first selector 18 or the second selector 20 to selectively superimpose the aim point 180 from the second imaging system 200 in the display 146 in the first imaging system 100. As noted above, the system 10 may compute the aim point 180 by matching the output from a sensor in the second imaging device 200 with the output from a sensor in the first imaging device 100.

As shown in FIG. 6B, the system 10 may be capable of superimposing a partial image 184, from the weapon-mounted imaging system 200, with an aim point 180 in the display of the helmet-mounted imaging system 100 for a precise aim point. In this example, a partial image 184 from the second imaging system 200 along with an aim point 180 may be overlaid in the display 146 in the first imaging system 100 directly on top of the image from the first imaging system 100. The user may utilize the first selector 18 or the second selector 20 to selectively superimpose the aim point 180 and the partial image 184 in the display 146. As noted above, the system 10 may compute the aim point 180 by matching the output from a sensor in the second imaging device 200 with the output from a sensor in the first imaging device 100.

Figure 6D:
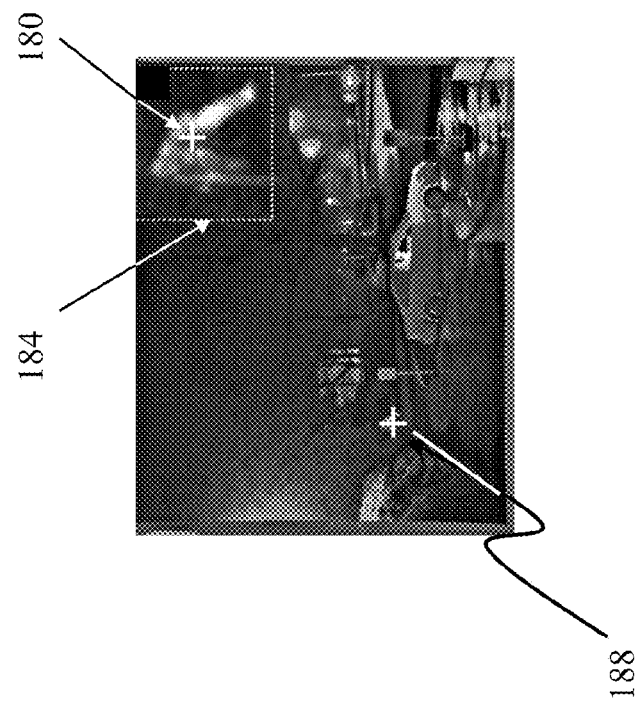
Figure 6C:
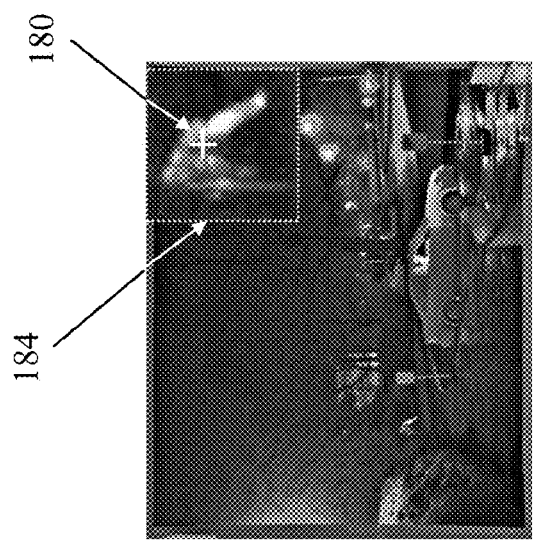

As shown in FIG. 6C the system 10 may be capable of superimposing a partial image 184, from the weapon-mounted imaging system 200, with an aim point 180 in the display of the helmet-mounted imaging system 100 for a precise aim point. In this example, a partial image 184 from the second imaging system 200 along with an aim point 180 may be overlaid in a corner or other location in the display 146 in the first imaging system 100. The user may utilize the first selector 18 or the second selector 20 to superimpose the aim point 180 and the partial image 184 in the display 146. As noted above, the system 10 may compute the aim point 180 by matching the output from a sensor in the second imaging device 200 with the output from a sensor in the first imaging device 100.

As shown in FIG. 6D the system 10 may be capable of superimposing a partial image 184, from a weapon-mounted imaging system 200, with a first aim point 180 and a second aim point 188 in the display of the helmet-mounted imaging system for more precise aiming. In this example, the partial image 184 from the second imaging system 200 along with the aim point 180 may be overlaid in a corner or other location in the display 146 in the first imaging system 100 and the second aim point 188 may be superimposed directly on top of the image from the first imaging system 100

The imaging systems 100, 200 may be called upon by a user to view a target or area of interest in a variety of adverse conditions, for example in very low light conditions, through smoke or heavy fog, and sand storms. The system 10 provides the advantage that the user is "looking" directly through the weapon sight for firing purposes while still maintaining situation awareness in the rest of the display.

Figure 7:
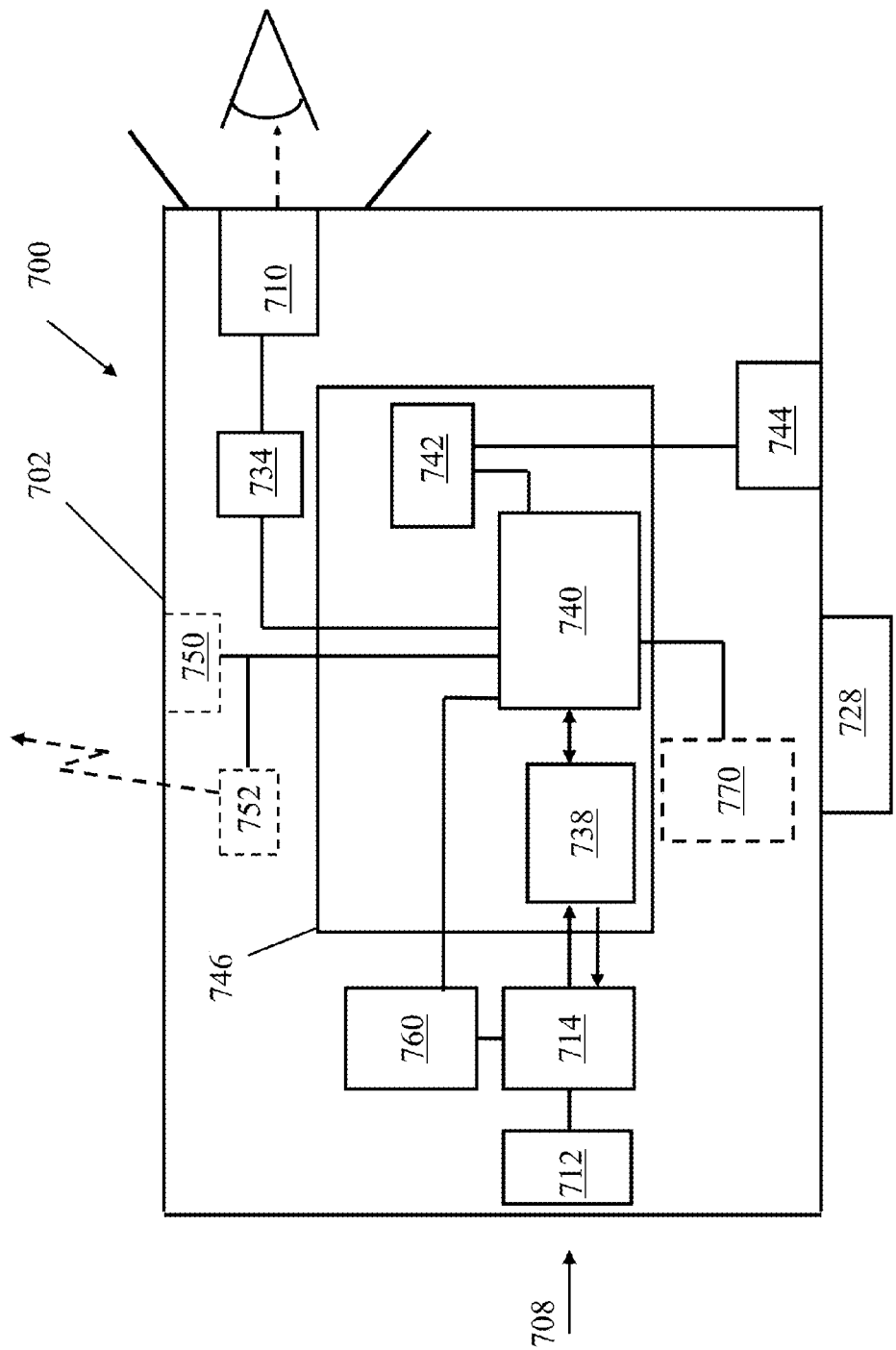
FIG. 7 is a block diagram of a third imaging system consistent with a third embodiment of the invention.

FIG. 7 is a block diagram of the third imaging system 700 consistent with a third embodiment of the invention. The electronics and optics may be at least partially housed in a housing 702 and powered by an internal power source 744 or an external power source. The third imaging system 700 may be coupled to a weapon with a mount 728. Scene information 708 may enter the system 700 through a first objective lens 712, which may have an adjustable focus, and be directed onto a first sensor 714. The sensor 714 may operate in the visible portion of the electromagnetic spectrum (from ~400 nm to ~750 nm) or the infrared portion of the electromagnetic spectrum (from ~750 nm to ~14,000 nm), e.g., SWIR (short-wave infrared), MWIR (medium wave infrared), or LWIR (long wave infrared), or both, for example an image intensification ($I^2$) tube. Other sensor technologies including near infrared electron bombarded active pixel sensors (EBAPS) or short wave InGaAs arrays may be used without departing from the invention. The output of the sensor 714 may be coupled to processing electronics 746 and the output of the electronics 746 may be inputted into a display 734 for viewing through the eyepiece(s) 710. The eyepiece(s) 710 may have one or more ocular lenses for magnifying and/or focusing the information on the display 734. Alternatively, the display may be mounted for direct viewing i.e. without an eyepiece. The third imaging system 700 may also have a third inertial measurement unit (IMU) 770. The IMU 770 may detect the current rate of acceleration, as well as changes in rotational attributes, including pitch, roll and yaw of the third imaging system 700. The IMU data may then be communicated to the processing electronics 746 and/or another imaging system through the wired port 750 or the wireless transmitter port 752.

Processing electronics 746 may include an analog circuit card assembly 738, a digital circuit card assembly 740, and a power circuit card assembly 742 and may be combined on a single circuit assembly for example an ASIC, DSP chip, or other component to process the scene information 708. Processing of scene data may cause a delay of one or more frames between the time of capture and image display. When viewing a stationary object without jiggling the imaging system 700, this delay may be imperceptible to the operator. However, when scene information 708 is changing or the imaging system 700 is not being held steady, this delay can cause viewing difficulties. These viewing difficulties may prevent a soldier or operator from easily identifying a target or comprehending information on signs.

The third imaging system 700 may utilize image stabilization to reduce viewing difficulties caused by either information in the scene changing or movement of the imaging system 700, for example by hand jitter. Image blur due to hand jitter may be reduced by mechanically stabilizing the sensor. A two-axis piezoelectric or quartz gyroscope (or two (2) one-axis gyros), an accelerometer, or an IMU may be used to measure the movement of the camera and a microcontroller in the digital circuit card assembly 740 may direct that signal to a small linear or rotary actuator 760 that moves the sensor or other object, for example a lens somewhere in the optical chain, to compensate for movement of the imaging system so the light strikes the pixels of the sensor as though the imaging system were not shaking. Three-axis gyroscopes may also be used to detect changes in pitch, yaw, and roll. The gyros may utilize MEMS technology.

In addition to the image blur that is visible in an individual frame, the image shift from one frame to the next can further reduce viewability. This reduced viewability can be improved utilizing electronic image stabilization with input from gyros or accelerometers (see Image Stabilization Technology Overview by David Sachs, Steven Nasiri, and Daniel Goehl, which is incorporated herein by reference in its entirety). The electronic image stabilization may be accomplished using software or firmware located in digital circuit card assembly 740, for example in a microcontroller or DSP chip.

Alternatively, electronic image stabilization, without input from gyros or accelerometers, can be accomplished using an algorithm capable of detecting an object/feature in the scene. Instead of the system altering the direction of the light as it approaches the image sensor, the output image is shifted on the display a certain number of pixel(s) by the software or firmware. The system may determine how much the object/feature moves from one frame to the next and move an image of the subsequent frame on a display so it appears to be in the same location as in the previous frame so the object/feature does not appear to move on the display. The software or firmware may be capable of shifting the output image in an attempt to keep one or more objects/features in the scene located in approximately the same place on the display. In-line real-time image stabilization may be placed between the output of a sensor and a display (see Stable Eyes, Real-Time Image Stabilisation for High-Zoom Surveillance Cameras, which is incorporated herein by reference in its entirety). In one embodiment, a combination of optical and electronic stabilization may be used.

The imaging system 700 is capable of displaying a series of sequential frames. If the imaging system 700 moves from frame to frame, the subsequent frames will represent different views of a scene. When viewed on a display, the resulting video will appear to have wobble, jitter, or other type of objectionable movement artifacts. This can adversely affect the operator's ability to detect, recognize and identify objects in addition to being visually objectionable. An electronic image stabilization algorithm can be employed to stabilize the displayed video. This may improve the acceptability of the video and the ability of the operator to detect, recognize, and identify objects and signs. One such image stabilization algorithm may be described as follows. Successive frames are registered to each other using features in the video frames. Motion is calculated using the frame to frame motion. Once the motion is known, successive frames can be adjusted in the position of the display such that they appear to be motionless. For example, if a feature is calculated to have moved three pixels to the left and two pixels up, then it would be displayed three pixels to the right and two pixels down so as to appear not to have moved relative to the previous frame.

In certain cases such as weapon mounted sights, the use of electronic image stabilization is desirable to improve the display but undesirable in that it does not display where the weapon is actually pointed. This problem can be solved by providing an electronic reticle that displays where the imaging system 700 is pointed as the image is stabilized. If the imaging system 700 is boresighted to the weapon, then the reticle will display where the weapon is pointed. While this is especially useful for weapon sights, it is not restricted to only weapon sights and may have application in areas where it would be useful to have a stabilized video and also know where the imaging system is pointed, for example, but not limited to navigating a robotic vehicle and covert aiming applications as discussed above. For the picture-in-picture mode, the weapon sight video may be displayed to the operator wearing a head-mounted imaging system. By stabilizing the weapon sight image, the video displayed to the operator will be more useful. By displaying the reticle that shows where the weapon is pointed, the operator may retain knowledge of where the weapon is pointed. For the mode where the entire display of the helmet mounted imaging system is replaced by the weapon sight view, the application of image stabilization with moving reticle is also helpful.

Figure 8B:
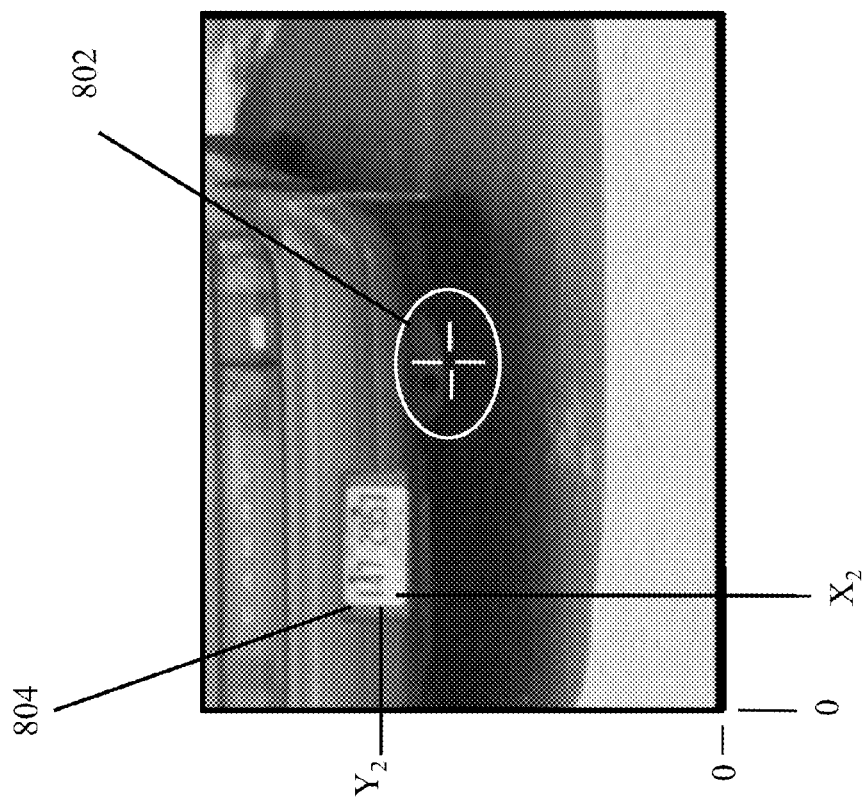
FIGS. 8A and 8B are a first and a second frame respectively of a scene through the third imaging system of FIG. 7.
Figure 8A:
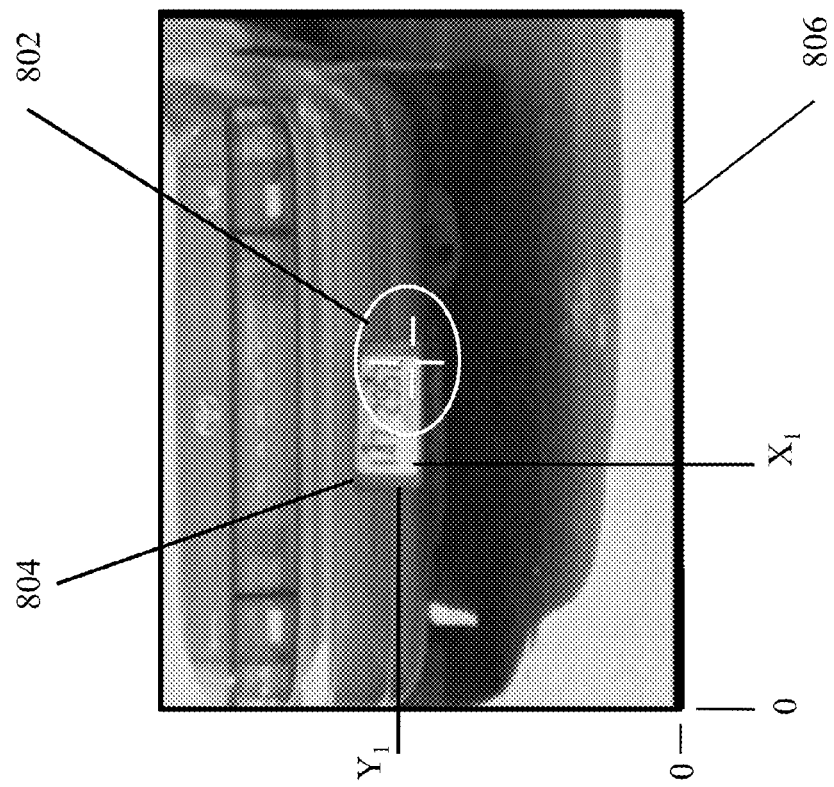

FIGS. 8A and 8B are a first frame and a second frame respectively of a scene as viewed through the third imaging system 700 of FIG. 7 with an image stabilizer algorithm consistent with the invention disabled. An operator looking through a hand-held or weapon-mounted imaging system 700 at a vehicle license plate 804 with an unsteady hand(s) may cause the viewed image to move in the display 806. For example, in FIG. 8A, the license plate 804 is located approximately in the center of the display 806, but in FIG. 8B, the license plate 804 moves up and to the left in the display 806. In FIG. 8A, a character in the license plate 804 may be located at a position $X_1, Y_1$ and the same character in FIG. 8b may be located at a position $X_2, Y_2$. If FIGS. 8A and 8B were sequential frames caused by movement of the imaging system 700 by the operator, the operator would have difficulties comprehending the license number because the display may appear to have wobble, jitter, or other types of objectionable movement artifacts. This viewing difficult may also adversely affect the operator's ability to detect, recognize, and/or identify objects in addition to being visually objectionable. Notice in both FIGS. 8A and 8B that a reticle 802 stays approximately in the center of the display 806 and that the image fills the display. The imaging system 700 may be mounted to a weapon and the reticle 802 may be boresighted to the weapon (for a certain distance to target) to indicate a point-of-impact of a projectile fired from the weapon.

FIGS. 9A and 9B are a third and a fourth frame respectively of a scene through the third imaging system 700 of FIG. 7 with the image stabilizer consistent with the invention enabled. An operator looking through a hand-held or weapon-mounted imaging system 700 at a vehicle license plate 904 even with an unsteady hand(s) may cause the viewed image to appear to be in approximately the same location on the display 806. For example, in both FIGS. 9A and 9B, the license plate 904 is located approximately in the center of the display 806. In both FIGS. 9A and 9B, a character in the license plate 904 may be located at a position $X_3, Y_3$. If FIGS. 9A and 9B were sequential frames caused by movement of the imaging system 700 by the operator, the operator would more easily be able to comprehend the license number because the object (license plate) is located in approximately the same location on the display 806. Note that the displayed image 908 does not completely fill the display 806 and in this embodiment the area outside the displayed image is filled with black pixels. Alternatively, the image may be electronically zoomed so as to not display black pixels. Other methods of displaying the stabilized image may be employed without departing from the invention.

Image stabilization may improve the acceptability of the resulting video and the ability of the operator to detect, recognize, and identify objects. In certain cases such as weapon sights, the use of electronic image stabilization is desirable to improve the display but undesirable in that it does not accurately reflect where the weapon is actually pointed. This problem may be resolved by providing an electronic reticle that displays where the imaging system 700 is pointed as the image is stabilized. The imaging system 700 can be boresighted to the weapon so that the reticle will display the point-of-impact of a projectile fired from the weapon (at a certain distance). Note that an electronic reticle 902 is located at a position $X_4, Y_4$ in FIG. 9A and is located at a position $X_5, Y_5$ in FIG. 9B. The imaging system 700 shifts the electronic reticle on the display 906 (in this case down and to the right) so it more accurately represents the point-of-impact of a projectile fired from the weapon. In addition, instability can be computed and displayed to the operator to aid in engagement of the targets. The operator may decide to fire or to steady the weapon more. Image stabilization with moving reticle in a rifle sight application can improve the ability of the operator to detect, recognize, and identify objects; improve speed of engagement; and improve accuracy of hitting the target. While this is useful for weapon sights, it is not restricted to only weapon sights. It will have application in areas where it would be useful to have a stabilized video and also know where the camera is pointed, for example when navigating a robotic vehicle.

In the example shown in FIG. 9A, in first frame at time $T_1$, a number "1" on the license plate is located at coordinates $X_3$, $Y_3$ and the reticle 902 is located at coordinates $X_4, Y_4$. In a subsequent frame as shown in FIG. 9B at time $T_2$, the electronic image stabilization algorithm has moved the image a first quantity of pixels in a first direction (up a first distance $Y_5-Y_4$) and over to the right a second and perpendicular direction (over a second distance $X_5-X_4$) in order to maintain the number "1" on the license plate at approximately the same location $(X_3, Y_3)$ and the reticle 902 is moved the first quantity of pixels in a third direction opposite the first direction (down the first distance $Y_5-Y_4$) and the second quantity of pixels in a forth direction opposite the second direction (over to the left the second distance $X_5-X_4$) in order to indicate where the weapon upon which the imaging system 700 is mounted is directed.

The amount of image stabilization may be varied depending on user requirements and may be user selectable. Using a low-pass filter, the high frequency, "jittery" motion may be removed from the output video while pans and zooms may be retained. This may give the stabilized output a more visually pleasing and natural appearance. The amount of smoothing can be varied from low (little or no stabilization) to high/"rock solid" (stable/little or no perceived image movement). In the "rock solid" mode, the system attempts to move the image on the output screen/display such that things on the output screen/display appear to not move from frame to frame. A "smooth" mode, between low and the high, may allow a user to move the image to be such that the desired aim point is centered on the output screen. After the target is centered in the output screen using the "smooth" mode, the user may select the "rock solid" mode to fire.

Figure 11:
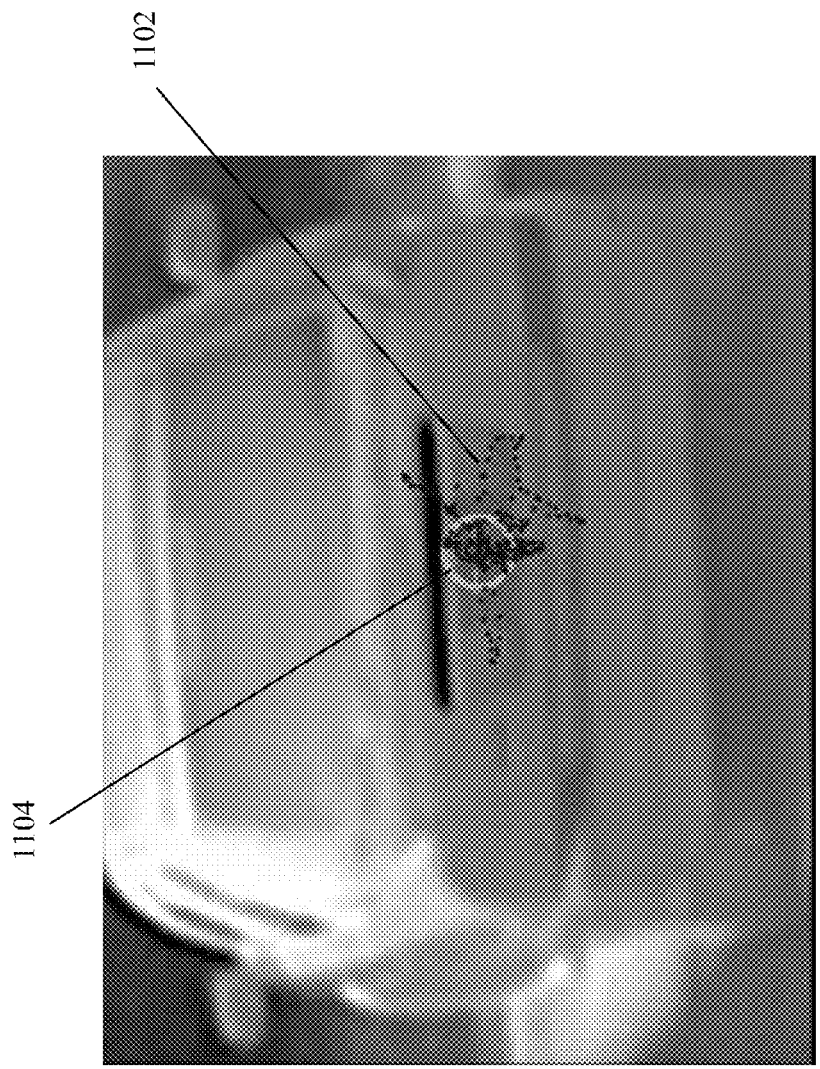
FIG. 11 is a plot showing a series of "aimpoints" viewed through an unsteady camera.

FIG. 11 is a plot showing a series of "aimpoints" 1102 viewed through an unsteady camera with each "aimpoint" 1102 representing where the camera is aimed at a particular time. As can be seen, any movement of the camera causes the "aimpoint" to move. A circular (or other shape) error of probability 1104 may be displayed to show the user how steady their aim is with a smaller shape indicating a steadier aim. The size of the shape, or the shape itself, can be calculated based on an algorithm. The algorithm may be set up such that the size and or shape changes in order to have a certain percentage (for example 50%) of the "aimpoints" located within the shape. The algorithm may use a variety of methods for determining the size and shape of the error of probability 1104 based on the data received including a straight average of the last so many frames, a weighted average, etc. without departing from the invention. A user may use this circular error of probability 1104 in an imager coupled to a weapon as a training tool to practice minimizing movement or to help determine if the aim is solid enough to take a shot.

Figure 10:
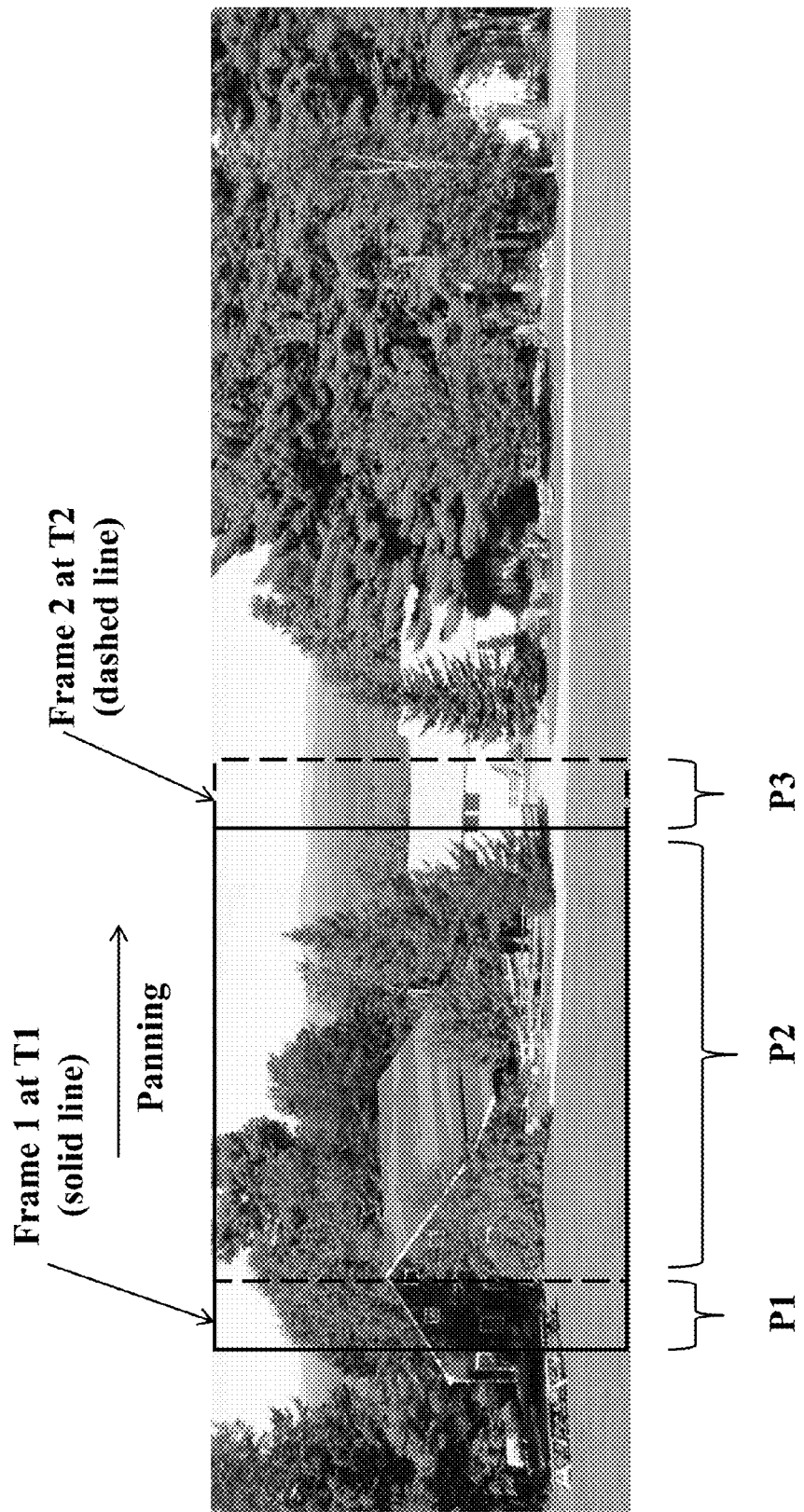
FIG. 10 is a panoramic view of an outdoor scene.

The processing of scene data can cause a lag of one or more frames between the time of image capture and image display. This visual lag may be more noticeable and objectionable when an operator is panning the imaging system, whether head-mounted, weapon-mounted, or handheld. FIG. 10 is a panoramic view of a scene and at a time T1, the sensor can see a first frame of scene information Frame 1 and when the operator pans the imaging system at a time T2, the sensor can see a second frame of scene information Frame 2. Ideally, Frame 1 would be displayed at time T1 and Frame 2 would be displayed at time T2, but with one frame (for example) of visual lag Frame 1 is displayed to the operator one frame period later at time T2. The lag caused by processing of the scene information causes the image displayed to be spatially misaligned with the actual pointing of the imaging system and could be bothersome to an operator. In the case of a head-mounted system the lag could cause disorientation and nausea to the operator, for a weapon-mounted application the lag could result in error when aiming the weapon, and for handheld systems it could make pointing and steadying of the system more difficult.

In an imaging system, like the one shown in FIG. 4, to reduce visual lag the processor 140A could accept input(s) from a motion sensor (accelerometer, gyro, etc.) 170 to shift an image on the display 146 based on movement of the imaging system 100. In the example shown, the system 100, views and captures portions P1 and P2 of the scene at time T1 and the delay caused by processing is a single frame. When the system 100 senses movement, in the example shown the imaging system pans to the right, the processor 140A can drop portion P1, shift portion P2 to the left, and blank portion P3 of the image presented on the display 146 at time T2. The scene information from portion P1 may be thrown out, portion P2 will be one (I) frame old, and portion P3 will be blank, but the spatial orientation of the image on the display 146 will more accurately reflect where the imaging system is pointed at time T2. The processor 140A can determine the amount of shift in display pixels based on the field of view of an individual pixel (IFOV) (in degrees of angle), the elapsed time between image capture and image display (in seconds), and the sensed rate of motion (in degrees per second), as given in equation 1.

$$\text{Image Shift(pixels)} = \text{Rate (°/sec)} \times \text{Time (sec)} \div IFOV(°) \quad \text{(eq. 1)}$$

The field of view of an individual pixel (IFOV) is set by the combination of the sensor 114 pixel geometry and effective focal length (EFL) of the objective lens 112, as given in equation 2.

$$IFOV(°) = \text{pixel size (mm)} \div EFL \text{ (mm)} \times 180(°) \text{'} pi \quad \text{(eq. 2)}$$

While the specific example depicted in FIG. 4 demonstrates a principle of the invention with motion in the horizontal direction it should be apparent that the invention can be equivalently applied for motion in the vertical direction or a combination thereof by using additional or multi-axis motion sensors.

In a system with a real-time imager, for example an image intensifier tube, and an imager with a delay, the processor can accept input(s) from a motion sensor to advance the position of the imager on the delay such that the images coincide/overlap and when the images are combined as in a fusion system the displayed image more accurately reflects where the imaging system is pointed.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A vision system, comprising:
a first imager in a first housing having a first image sensor, a display, and a first orientation sensor configured to track an optical axis of the first imager;
a second imager in a second housing having a second image sensor and a second orientation sensor configure to track an optical axis of the second imager; and
a processor configured to receive scene data from the second image sensor and orientation data from the first and second orientation sensors, the processor configured to superimpose an aim point determined from the second sensor in the display when the optical axis of the first imager is known with respect to the optical axis of the second imager.

2. The vision system of claim 1, wherein the orientation sensor is an inertial measurement unit.

3. The vision system of claim 1, wherein the first image sensor senses in the visible spectrum and the second image sensor senses in the infrared spectrum.

4. The vision system of claim 3, wherein the first sensor is an image intensifier tube.

5. The vision system of claim 1, wherein a first direction vector is established based on information from the first orientation sensor, the first direction vector being generally parallel with the optical axis of the first imager and a second direction vector is established based on information from the second orientation sensor, the second direction vector being generally parallel with the optical axis of the second imager, and a third direction vector relates the first direction vector to the second direction vector.

6. The vision system of claim 1, wherein the first orientation sensor can detect the current rate of acceleration.

7. The vision system of claim 6, wherein the first orientation sensor can detect changes in pitch, roll and yaw.

8. The vision system of claim 5, wherein the third direction vector is used to determine if the first imager and the second imager have overlapping fields-of-view.

9. The vision system of claim 8, wherein an image from the first imager is registered with an image from the second imager using an image processing technique.

10. The vision system of claim 9, wherein the image processing technique is a selected one or more of magnification correction, skew correction and edge detection.

11. The vision system of claim 9, wherein the aim point and a portion of the scene from the second imager are superimposed in the display.

12. The vision system of claim 11, wherein the aim point a portion of the scene from the second imager are superimposed in a corner of the display.

13. The vision system of claim 12, wherein the aim point and a portion of the scene from the second imager are superimposed in a corner of the display and just the aim point is superimposed in a central portion of the display.

14. An imaging system mountable on a weapon, comprising:
a sensor for sensing scene information; and
a processor configured to process scene information received from the sensor and displaying the processed scene information in a display, the processor capable of displaying a reticle on the display that can be aligned with a point-of-impact of a weapon, the processor further capable of shifting the processed scene information on the display so a feature in the scene is located in approximately the same location on the display for a sequential frame despite movement of the imaging system, the processor capable of shifting the reticle in a direction different from the direction the processed scene information is shifted to maintain alignment of the reticle with the point-of-impact of the weapon.

15. The imaging system of claim 14, wherein the display is mounted on the weapon.

16. The imaging system of claim 14, wherein the processor is configured to allow one or more reticles to be aligned with a point-of-impact of the weapon at a plurality of distances to target, the one or more reticles being stored in memory.

17. A method of improving viewability of an imaging system, comprising the steps of:

displaying a reticle on a display having an array of pixels in an imaging system for directing weapon fire;

obtaining a first frame of scene information from a sensor at a time T1 and displaying the first frame of scene formation on the display;

obtaining a second, subsequent frame of scene information from the sensor at a time T2;

aligning a feature from the second frame on the display with the same feature from the first frame at approximately the same location on the display by moving the second frame a first quantity of pixels in a first direction and a second quantity of pixels in a second direction perpendicular to the first direction; and moving the reticle on the display approximately the first quantity of pixels in a third direction opposite the first direction and approximately the second quantity of pixels in a fourth direction opposite the second direction.

18. The method of claim 17, the aligning of a feature from the second frame on the display with the same feature from the first frame uses an image processing technique.

19. The method of claim 18, wherein the image processing technique is a selected one or more of skew correction and edge detection.

20. A method of improving viewability of an imaging system, comprising the steps of:

obtaining a first frame of scene information from a sensor at a time T1 and displaying the first frame of scene formation on a display;

obtaining a second subsequent frame of scene information from the sensor at a time T2;

obtaining movement information of the sensor from time T1 to time T2; and indexing a portion of the scene from the sensor at the time T1 on the display in a direction opposite the sensed movement, the portion of the scene being indexed to more accurately reflect where the imaging system is pointed.

21. The method of claim 20, wherein the amount of shift is based on the field of view of an individual pixel of the sensor and the elapsed time between image capture and image display.

22. The method of claim 20, wherein the field of view of an individual pixel is determined using information about the sensor geometry and the effective focal length of an objective lens of the imaging system.

23. The imaging system of claim 14, wherein the different direction is opposite the direction the scene information is shifted.

* * * * *